(12) United States Patent
Bruccoleri et al.

(10) Patent No.: US 7,042,339 B2
(45) Date of Patent: May 9, 2006

(54) PLUG-IN SINGLE PHASE POWER LINE SIGNAL REPEATER WITH LOW VOLTAGE BUS

(75) Inventors: Damon Bruccoleri, Long Branch, NJ (US); Lev Bogorad, Roosevelt Island, NY (US); Michael Ostrovsky, Brooklyn, NY (US); Alfred Lombardi, LaGrangeville, NY (US); Joseph G. Justiniano, Centereach, NY (US); Raymond Szekretar, Plainview, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 743 days.

(21) Appl. No.: 10/166,342

(22) Filed: May 31, 2001

(65) Prior Publication Data
US 2003/0031310 A1 Feb. 13, 2003

(51) Int. Cl.
*H04M 11/04* (2006.01)

(52) U.S. Cl. .............................. 340/310.13; 340/310.12

(58) Field of Classification Search ........... 340/310.01, 340/310.02, 310.03, 310.04, 310.05, 310.06, 340/534, 538; 307/31, 39, 3; 455/419, 420
See application file for complete search history.

(56) References Cited

U.S. PATENT DOCUMENTS

| | | | | |
|---|---|---|---|---|
| 5,802,467 A | * | 9/1998 | Salazar et al. | 455/420 |
| 5,977,650 A | * | 11/1999 | Rickard et al. | 307/3 |
| 6,229,432 B1 | * | 5/2001 | Fridley et al. | 340/310.01 |
| 6,278,357 B1 | * | 8/2001 | Croushore et al. | 340/310.01 |
| 6,441,723 B1 | * | 8/2002 | Mansfield et al. | 340/310.01 |
| 6,624,532 B1 | * | 9/2003 | Davidow et al. | 307/39 |

* cited by examiner

*Primary Examiner*—Van T. Trieu
(74) *Attorney, Agent, or Firm*—Paul J. Sutton

(57) ABSTRACT

A control system and method suppress noise in a power-line-based system which has a device repeater connected to an electrical device, and which may be capable of remote control by signals transmitted through the power-line-based system. The control system includes a control device and a communications bus. The communications bus connects the control device to the device repeater. The control device, using a control repeater, controls a phase signal of the device repeater to suppress noise during operation of the electrical device associated with the device repeater.

20 Claims, 3 Drawing Sheets

PLUG-IN SINGLE PHASE POWER LINE SIGNAL REPEATER WITH LOW VOLTAGE BUS

FIELD OF THE INVENTION

The present invention relates to noise suppression in power line signal transmission systems, and in particular to noise suppression in communication systems employing remote control of electrical devices over power lines.

BACKGROUND OF THE INVENTION

Remote control systems are known to utilize control signals transmitted over power lines, such that appliances connected to the power lines receive power therefrom and also receive such control signals. However, signal degradation over extended power networks within a facility reduces the sensitivity and impairs the operation of such remote control systems to operation appliances remotely. For example, control signals may "bleed" over the phases of the power lines. Such signal degradation and bleeding may be compensated for by using amplifiers/repeaters throughout the power distribution network, which improve the signal quality sufficiently until the control signals either reach the intended appliance to remotely control, or reach another amplifier/repeater for additional boosting of the control signals.

The use of multiple amplifier/repeaters throughout a power network may be required, especially for large and physically extensive facilities. However, individual amplifiers/repeaters typically work as stand-alone devices, which amplify signals regardless of the presence of other amplifiers and repeaters. Accordingly, some cross-talk and iterative amplifications of signals may occur which impair the ability of the amplifiers/repeaters to compensate for noise by, for example, contributing additional signal noise within the power network.

A need exists for the control of multiple repeaters to compensate for noise in a controlled manner.

In addition, repeaters may be modular for ease of installation, such as the ability to plug-in such repeaters into ordinary and/or standard power lines, outlets, and appliances. However, the coordination of multiple repeaters would typically require additional communications infrastructure on top of the existing power distribution system.

A need exists for a modular and/or plug-in control system which may be readily integrated with the existing power distribution system for operation with multiple repeaters in the power distribution system.

SUMMARY OF THE INVENTION

A control system and method suppress noise in a power-line-based system which has a device repeater connected to an electrical device, and which may be capable of remote control by signals transmitted through the power-line-based system. The control system includes a control device and a communications bus. The communications bus connects the control device to the device repeater. The control device, using a control repeater, controls a phase signal of the device repeater to suppress noise during operation of the electrical device associated with the device repeater.

DETAILED DESCRIPTION OF THE PREFERRED EMBODIMENTS

Figure 1:
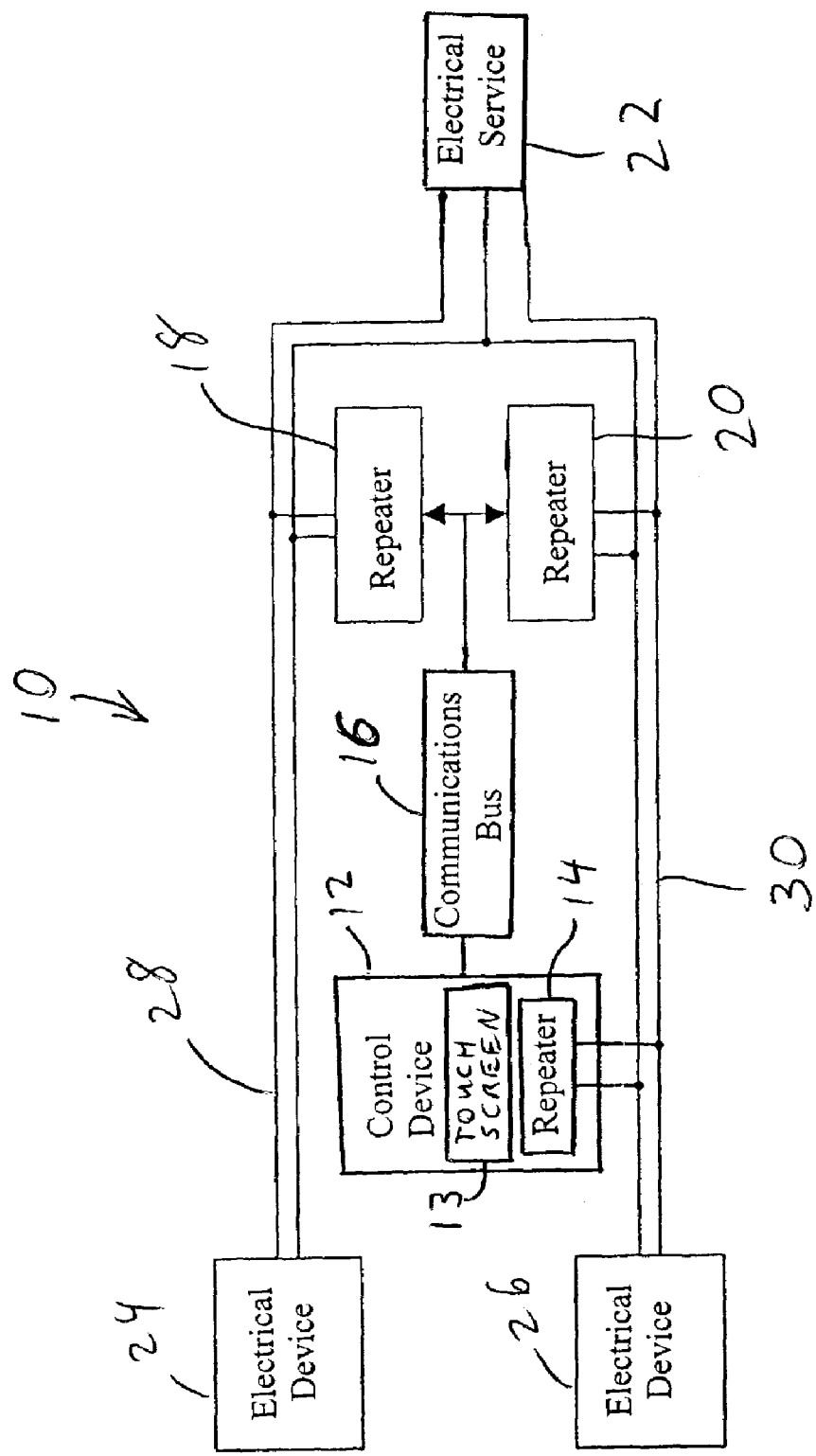
FIG. 1 illustrates the disclosed control system including a control device and a communications bus.

As shown in FIG. 1, a system 10 and method of operation are disclosed for suppressing noise. The system 10 includes a control device 12, which may include and/or may be incorporated into a control repeater 14, and which includes a communications bus 16 which connects the control device 12 to one or more electrical-device-based repeaters 18, 20. Each of the device repeaters 18, 20 and the control device 12 and/or the control repeater 14 is connected to electrical service 22 which provides power to electrical devices 24, 26. In operation, the control device 12, in conjunction with the communications bus 16, controls the phases or phase signals of the power and/or control signals distributed throughout the network of devices 24, 26 from the electrical service 22, in which the control device 12 and/or its repeater 14 communicates with the other repeaters 18, 20 over the communications bus 16, for example, using control signals generated by the control repeater 14 and/or common voltage, current, or phase values associated with the repeaters 14, 18, 20 to suppress the noise in at least a portion of the network of electrical devices 24, 26, such as noise at a specific electrical device 24.

In an example embodiment, each of the repeaters 14, 18, 20 may be single-phase repeaters and/or other signal amplifier and/or repeater components known in the art, such as the X10 Signal Amplifier/Repeater, Model 4820, or may be the "DECORA HOME CONTROLS" (DHC) System Amplifier/Repeater, Model 6201, each of the amplifier/repeater components being commercially available, for example, from "LEVITON MANUFACTURING, CO., INC.". Such repeaters 14, 18, 20 are used to regenerate signals distributed over relatively large electrical distribution networks from the electrical service 22 to single family homes, apartments, commercial facilities, and condominiums.

The electrical devices 24, 26 may be appliances, machinery, or other components which require a connection via power lines 28, 30, including phase lines and neutral lines, to the electrical service 22, such as an electrical circuit breaker panel interfacing external power lines to the system 10. In an alternative embodiment, the control device 12 and/or its repeater 14 may be connected to the electrical service 22 indirectly, that is, not to the electrical circuit breaker panel of a home or facility.

The repeaters 14, 18, 20 as well as the control device 12 and the electrical devices 24, 26 may be modular and/or may be removable coupled to the power lines 28, 30 and to other connection interfaces with each other and with the electrical service 22. For example, the repeaters 14, 18, 20 may be plug-in packages and units with plugs and/or sockets for interconnection using standardized plug/socket configurations.

Figure 4:
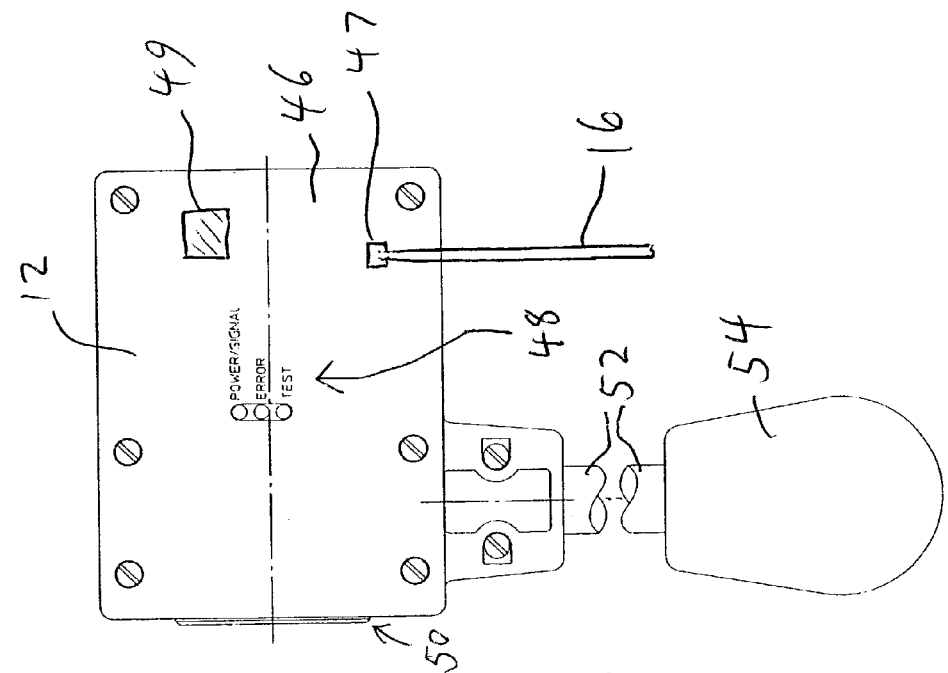
FIG. 4 illustrates a front view of an embodiment of the control device of FIG. 1.
Figure 3:
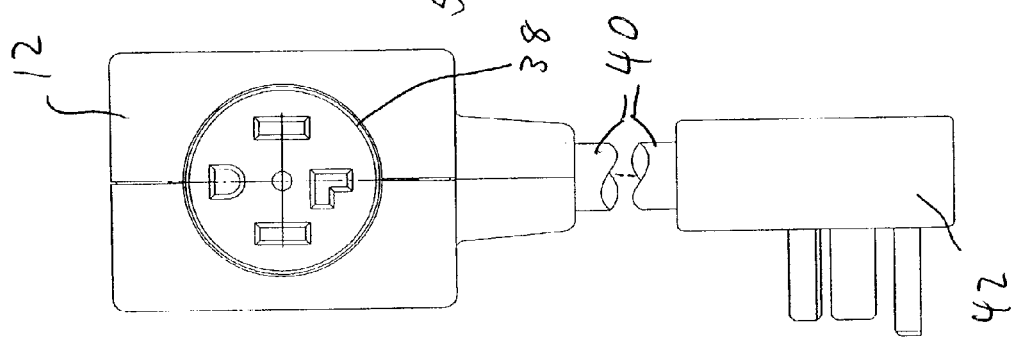
FIG. 3 illustrates a side view of a second embodiment of the control device of FIG. 1.
Figure 2:
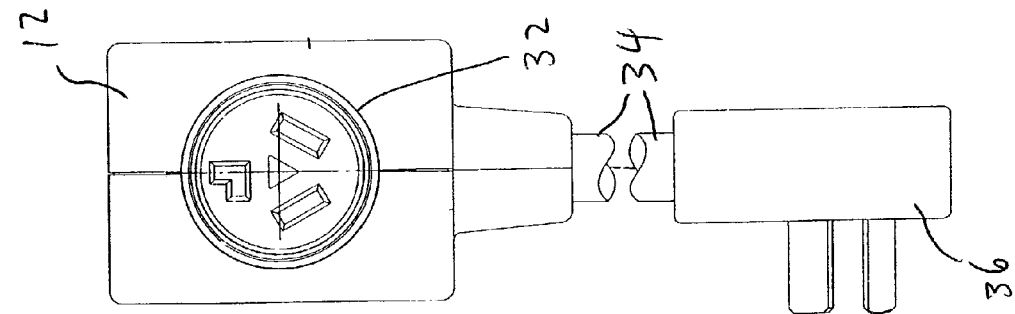
FIG. 2 illustrates a side view of a first embodiment of the control device of FIG. 1.

In example embodiments, shown in side views of in FIGS. 2–3, the control device 12 may be implemented with a three-pole, three-wire non-grounding outlet 32 connected via a cable 34 to a three-pole, three-wire plug 36, as in FIG. 2; or with a three-pole, four-wire grounding outlet 38 connected via a cable 40 to a three-pole, four-wire plug 42 with a ground pin, as in FIG. 3. FIG. 4 illustrates a front view of the control device 12 having a body 46 with a port 47 in which is mounted the communications bus 16 to connect the control device 12 to the plurality of repeaters 18, 20. For example, the port 47 may be a jack such as a telephone-type jack known in the art which permits the communications bus 16, in the form of a wire, to be removably mounted in the port 47, with electrical contacts of the communications bus 16 and the port 47 being in removable physical engagement to establish an electrical path for conveying electrical signals between the control device 12, through the port 47, to the communications bus 16 and thence to the repeaters 18, 20.

The control device 12 may also include indicator lights 48, such as light emitting diodes (LEDs) or other display devices such as computer screens, touch screens, and/or liquid crystal displays (LCDs), mounted in the body 46 and externally exposed for indicating the status of operation of the control device 12, such as POWER/SIGNAL for normal powered-up operation, ERROR for a malfunction or error condition, and TEST for test or diagnostic operation.

In alternative embodiments, instead of or in addition to the port 47 for connecting the control device 12 to the communications bus 16 and thence to the repeaters 18, 20, the control device 12 may include a wireless emitter 49, such as a transmitter with a window in the body 46, for emitting wireless signals, such as infrared (IR) or radio frequency (RF) signals, to the repeaters 18, 20. Using such an emitter 49, the communications bus 16 may be implemented as a communications channel, such as any medium which is not opaque to such wireless signals, and/or as a waveguide or fiber such as a fiber optic for conveying such wireless signals to compatible receivers included in the repeaters 18, 20, with the repeaters 18, 20 configured to respond and/or be controlled by such wireless signals.

As shown in FIG. 4, the body 46 of the control device 12 includes a socket 50, such as the sockets 32 or 38, and is attached to a cable 52, such as the cables 34 or 40, to a plug 54, such as the plugs 36 or 42, as in FIGS. 2–3, respectively. The socket 50 and plug 54 are connected to each other internally within the body 46, with the control repeater 14 connected to each of the socket 50 and plug 54, for example, with the control repeater 14 being configured in parallel electrically with the socket 50 and plug 54 in a manner known in the art. For example, referring to FIG. 1 in conjunction with FIGS. 2–4, the control repeater 14, through the socket 50 and plug 54, is connected through the power lines 28, 30 to the repeaters 18, 20, with the control repeater 14 and the plurality of repeaters 18, 20 configured in parallel electrically.

Figure 5:
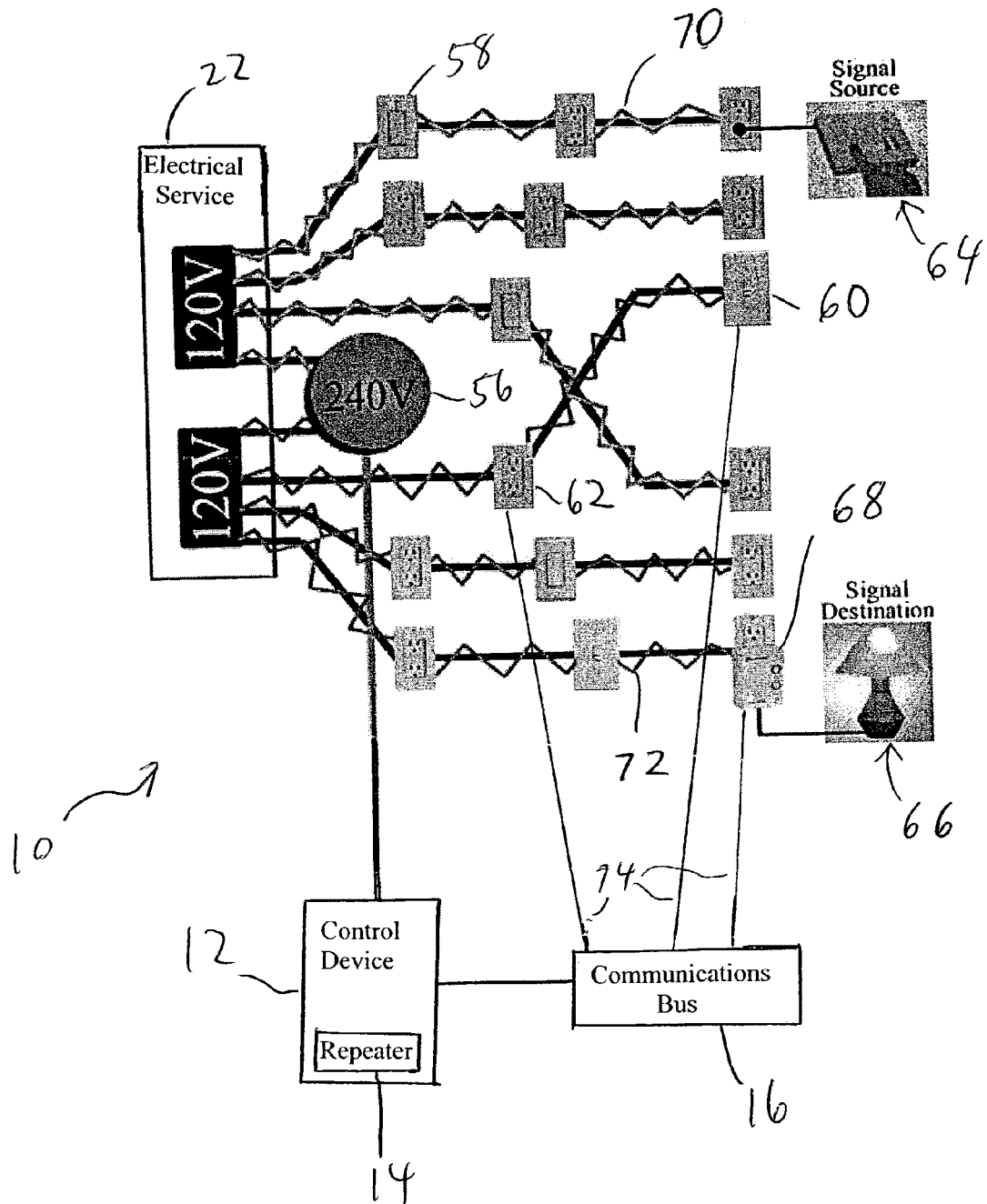
FIG. 5 illustrates the control system of FIG. 1 in greater detail.

In an alternative embodiment of the disclosed system 10, shown in greater detail in FIG. 5, the electrical service 22 provides 120 VAC, and optionally 240 VAC through a voltage converter 56 such as a transformer connected to the 120 VAC power sources, to a plurality of electrical devices such as switches 58–60, outlets 62, appliance controllers 64, appliances 66, and a remote appliance activator 68. For example, using methods known in the art, an appliance controller 64 may act as a signal source for sending appliance control signals 70, 72 through the system 10 to the remote appliance activator 68 and a lamp as an appliance 66 which is a selected or predetermined signal destination to remotely turn the lamp on or off.

In the disclosed system 10 of the present invention, the control device 12, using the repeater 14 and the communications bus 16, coordinate and control the phase of the electrical signals transmitted over the system 10, for example, to suppress noise and to improve the remote detection of control signals 70, 72 by the appliance activator 68. One effect of the system 10, employing the control device 12 and the communications bus 16, is to provide noise immunity, for example, during critical operations of the overall power line communications operations, such as during a critical zero crossing interval of a 60 Hz sine wave used in the system 10 with the electrical devices therein which detect and respond to predetermined control signals over the electrical network.

The communications bus 16 includes a plurality of connections 74 to components of the system 10 having repeaters 18, 20 attached thereto or incorporated therein; for example, the illustrated components in FIG. 5 such as the switch 60, the outlet 62, and the appliance activator 68 may be connected by respective connections 74 to the control device 12 through the communications bus 16.

In operation, the control device 12, using the repeater 14 and the communications bus 16, controls and compensates for the loss of signal strength over different phases of a power line communications system, such as systems based on one or more components using commercially available "X-10", "DHC", "ECHELON", and/or "INTELLON" technology. Such power line communications systems typically include signal repeaters 18–20, for example, in large residential installations using computer-controlled lighting systems, to allow communications between phases and over long runs. The control device 12 with its repeater 14 and communications bus 16 may be connected to a pre-existing network of repeaters 18–20 in such power line communications systems known in the art.

As described herein, the control device 12 and/or the control repeater 14 may be implemented as modular components and/or plug-in packages using standardized plugs and sockets, as shown in FIGS. 2–4. In addition, the communications bus 16 may employ known communications wiring, such as standardized plugs and sockets including telephone wiring and jacks. Accordingly, the disclosed system 10 using the control device 12, the control repeater 14, and the communications bus 16 may be installed by consumers such as do-it-yourselfers to implement home-based remote appliance control and communication systems. In addition, the control device 12 and the communications bus 16 are scalable; that is, a customer may purchase and install as many repeaters 18, 20 as desired or needed to control multiple electrical devices 24, 26, with one repeater operating with at least one electrical device, and the control device 12 and communications bus 16 may be expanded and extended to connect to any number of repeaters 18, 20 as are present in the system 10 to control the transmission of power line signals and power-line-based control signals on the phase lines of a home or other facility.

In additional embodiments, the control device 12 may include computerized components, for example, microprocessor-based controllers, graphic user interfaces (GUIs) and/or a touch screen 13, as shown in FIG. 1, to permit a user, such as a home owner, to directly control operation of the entire system 10. The control device 12 and/or the communications bus 16 may thus also operate as a computer-to-power line interface for home control systems. For instance, the touch screen 13 may employ the same communications bus as the control repeater 14, and so the touch screen 13 may be able to transmit or otherwise control the power line signal over all phases of electrical signals in a home.

Furthermore, the control device 12 may employ a single-phase repeater as the control repeater 14, and so the control device 12 and the overall system 10 uses less circuitry and may be less expensive to implement with multiple repeaters 18, 20 through a facility than comparable configurations using commercially available multi-phase repeaters currently used in known power line communications systems.

What is claimed is:

1. A control device for controlling a phase signal of a device repeater connected to an electrical device in a power-line-based system, the control device comprising:
   a control repeater, connected to the device repeater by a communications bus, for suppressing noise in the power-line-based system.

2. The control device of claim 1, further comprising:
   a socket connected to the control repeater; and
   a plug connected to the control repeater, with the control repeater connected between the plug and socket;
   wherein the control device, with the plug and socket, is a modular plug-in package for connection to the power-line-based system.

3. The control device of claim 1, further comprising:
   a body in which the control repeater is disposed.

4. The control device of claim 3, further comprising:
   an indicator, externally mounted in the body, for indicating the operation function of the control device.

5. The control device of claim 4, wherein the indicator is a light emitting diode (LED).

6. The control device of claim 4, wherein the indicator is a touch screen.

7. The control device of claim 3, further comprising:
   a port, externally disposed in the body, for connecting the communications bus to the control repeater.

8. The control device of claim 1, wherein the control repeater is electrically connected through the communications bus to a plurality of device repeaters each associated with first and second electrical devices;
   wherein the first electrical device controls operation of the second electrical device using control signals, including the phase signal, transmitted through the power-line-based system; and
   wherein the control repeater suppresses noise in the phase signal during operation of the second electrical device by the first electrical device.

9. A control system for suppressing noise in a power-line-based system, with the power-line-based system including a device repeater connected to an electrical device, the control system comprising:
   a control device for controlling a phase signal of the device repeater to suppress the noise, the control device including:
   a control repeater; and
   a communications bus for connecting the control device to the device repeater.

10. The control system of claim 9, wherein the control device further comprises:
    a socket connected to the control repeater; and
    a plug connected to the control repeater, with the control repeater connected between the plug and socket;
    wherein the control device, with the plug and socket, is a modular plug-in package for connection to the power-line-based system.

11. The control system of claim 9, wherein the control device further comprises:
    a body in which the control repeater is disposed.

12. The control system of claim 11, wherein the control device further comprises:
    an indicator, externally mounted in the body, for indicating the operation function of the control device.

13. The control system of claim 12, wherein the indicator is a light emitting diode (LED).

14. The control system of claim 12, wherein the indicator is a touch screen.

15. The control system of claim 11, wherein the control device further comprises:
    a port, externally disposed in the body, for connecting the communications bus to the control repeater.

16. The control system of claim 9, wherein the power-line-based system includes first and second electrical devices with remote control capabilities provided through the power-line-based system;
    wherein the control repeater is electrically connected through the communications bus to a plurality of device repeaters each associated with a respective one of the first and second electrical devices;
    wherein the first electrical device controls operation of the second electrical device using control signals, including the phase signal, transmitted through the power-line-based system; and
    wherein the control repeater suppresses noise in the phase signal during operation of the second electrical device by the first electrical device.

17. A method for suppressing noise in a power-line-based system, with the power-line-based system including a device repeater connected to an electrical device, the method comprising the steps of:
    receiving a phase signal of the device repeater at a control device having a control repeater;
    generating a phase-control signal at the control device using the control repeater; and
    sending the phase-control signal from the control device to the device repeater via a communications bus; and
    suppressing noise associated with the phase signal using the device repeater controlled by the phase-control signal.

18. The method of claim 17, further comprising the step of:
    displaying an operation status using an indicator externally mounted in a body of the control device.

19. The method of claim 18, wherein the indicator is a light emitting diode (LED).

20. The method of claim 18, wherein the indicator is a touch screen.

* * * * *